United States Patent
Luo et al.

(10) Patent No.: US 12,289,684 B2
(45) Date of Patent: Apr. 29, 2025

(54) METHOD AND DEVICE FOR POWER-SAVING IN WIRELESS SIDELINK COMMUNICATION

(71) Applicant: ZTE Corporation, Guangdong (CN)

(72) Inventors: Wei Luo, Guangdong (CN); Lin Chen, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 372 days.

(21) Appl. No.: 17/940,234

(22) Filed: Sep. 8, 2022

(65) Prior Publication Data

US 2023/0018928 A1    Jan. 19, 2023

Related U.S. Application Data

(63) Continuation of application No. PCT/CN2020/079843, filed on Mar. 18, 2020.

(51) Int. Cl.
*H04W 56/00* (2009.01)
*H04W 52/02* (2009.01)
*H04W 72/0446* (2023.01)
*H04W 72/20* (2023.01)

(52) U.S. Cl.
CPC ... *H04W 52/0274* (2013.01); *H04W 52/0229* (2013.01); *H04W 72/0446* (2013.01); *H04W 72/20* (2023.01)

(58) Field of Classification Search
CPC ............. H04W 52/0274; H04W 72/20; H04W 52/0229; H04W 72/0446
USPC ......................................................... 370/318
See application file for complete search history.

(56) References Cited

U.S. PATENT DOCUMENTS

| | | | |
|---|---|---|---|
| 10,687,334 | B2 | 6/2020 | Yun |
| 10,887,736 | B2 | 1/2021 | Lee et al. |
| 11,044,748 | B2 | 6/2021 | Cao et al. |
| 11,582,729 | B2 | 2/2023 | Lu et al. |
| 12,041,581 | B2 | 7/2024 | Selvanesan et al. |
| 2016/0295624 | A1 | 10/2016 | Novlan et al. |
| 2019/0342910 | A1* | 11/2019 | Cao ............... H04L 5/0091 |
| 2019/0373647 | A1 | 12/2019 | Rugeland et al. |
| 2020/0029318 | A1 | 1/2020 | Guo |
| 2020/0359428 | A1 | 11/2020 | Pan et al. |

(Continued)

FOREIGN PATENT DOCUMENTS

| | | |
|---|---|---|
| CN | 107852727 A | 3/2018 |
| CN | 108476390 A | 8/2018 |

(Continued)

OTHER PUBLICATIONS

"Li et al., Broadcast, Multicast and Unicast on the Side Link of 5 G EV2X, Apr. 9, 2021, CN 112640346" (Year: 2019).*

(Continued)

*Primary Examiner* — Yemane Mesfin
(74) *Attorney, Agent, or Firm* — Crowell & Moring LLP

(57) ABSTRACT

This disclosure relates to methods and devices for wireless communication resource configuration. Various schemes of configuration of sidelink control resources and/or sidelink data communication resources enable reduction of time duration that a user equipment is required to monitor sidelink communication resources for sidelink data, thereby providing power saving in sidelink communication.

17 Claims, 9 Drawing Sheets

(56) References Cited

U.S. PATENT DOCUMENTS

| | | | | |
|---|---|---|---|---|
| 2021/0068055 | A1* | 3/2021 | Nam | H04L 5/0091 |
| 2021/0195522 | A1* | 6/2021 | Sridharan | H04W 52/0235 |

FOREIGN PATENT DOCUMENTS

| | | | |
|---|---|---|---|
| CN | 109644433 | A | 4/2019 |
| CN | 110383866 | A | 10/2019 |
| CN | 110521264 | A | 11/2019 |
| CN | 110536316 | A | 12/2019 |
| CN | 110536430 | A | 12/2019 |
| CN | 110710309 | A | 1/2020 |
| CN | 110839284 | A | 2/2020 |
| JP | 2017-139658 | A | 8/2017 |
| JP | 2017-139659 | A | 8/2017 |
| WO | WO 2017/052686 | A1 | 3/2017 |
| WO | WO 2017/134986 | A1 | 8/2017 |
| WO | WO 2017/135036 | A1 | 8/2017 |
| WO | WO 2018/028416 | A1 | 2/2018 |
| WO | WO 2018/064477 | A1 | 4/2018 |
| WO | WO 2019/066706 | A1 | 4/2019 |
| WO | WO 2019/157739 | A1 | 8/2019 |
| WO | WO 2019/160788 | A1 | 8/2019 |
| WO | WO 2019/240745 | A1 | 12/2019 |
| WO | WO 2020/011229 | A1 | 1/2020 |
| WO | WO 2020/033422 | A1 | 2/2020 |

OTHER PUBLICATIONS

Extended European Search Report, dated Feb. 17, 2023, pp. 1-9, issued in European Patent Application No. 20890119.9, European Patent Office, The Hague, The Netherlands.
Anonymous: "3rd Generation Partnership Project; Technical Specification Group Radio Access Network; NR; Medium Access Control (MAC) protocol specification (Release 16)", dated Mar. 1, 2020, pp. 1-142, 3GPP TS 38.321 VI6.0.0, XP055877597.
VIVO: "Views on general NR sidelink enhancements in Rel-17," dated Dec. 2, 2019, pp. 1-4, 3GPP Draft; RP-192542, 3rd Generation Partnership Project (3GPP), Mobile Competence Centre; 650, Route Des Lucioles; F-06921 Sophia-Antipolis, Cedex France vol. TSG RAN, No. Sitges, ES; Dec. 9, 2019-Dec. 12, 2019, XP051834183, Retrieved from the Internet: URL: https://ftp.3gpp.org/tsg_ran/TSG_RAN/TSGR_86/Docs/RP-192542.2ip
Office Action issued in Korean Patent Application No. 10-2022-7026556 dated Nov. 25, 2024, w/English translation, 32 pages.
Ericsson, "On configuration of resource pool" 3GPP TSG-RAN WG2 #106, R2-1907355, May 13, 2019, 3 pages.
Fraunhofer HHI et al., "Analysis and Design of V2X Resource Entities" 3GPP TSG RAN WG1 Meeting #95, R1-1812400, Nov. 12, 2018, 11 pages.
Huawei et al, "Introduction of 5G V2X with NR sidelink" 3GPP TSG-RAN2 WG2 Meeting #108, R2-2001966, Nov. 18, 2019, 491 pages.
Intel Corporation, "DRX in sidelink" 3GPP TSG RAN WG2#97, R2-1701309, Feb. 13, 2017, 2 pages.
Huawei et al. "Discussion on sidelink power control" 3GPP TSG RAN1 Meeting #89, R1-1707036, May 15, 2017, 3 pages.
Written Opinion issued in Vietnamese Patent Application No. 1-2022-04806 dated Sep. 5, 2024.
Canadian Office Action, dated May 24, 2024, pp. 1-5, issued in Canadian Patent Application No. 3,163,032, Canadian Intellectual Property Office, Gatineau, Quebec.

International Search Report mailed Dec. 9, 2020 for International Application No. PCT/CN2020/079843.
Written Opinion mailed Dec. 9, 2020 for International Application No. PCT/CN2020/079843.
European Communication pursuant to Article 94(3) EPC, Apr. 15, 2024, pp. 1-7, issued in European Patent Application Number 20 890 119.9, European Patent Office, Rijswijk, Netherlands.
Canadian Office Action, dated Dec. 15, 2023, pp. 1-7, issued in Canadian Patent Application No. 3,171,565, Canadian Intellectual Property Office, Gatineau, Quebec, Canada.
Fraunhofer HHI, Fraunhofer IIS, Resource Allocation for Mode 2 NR, dated Nov. 7, 2019, pp. 1-10, V2X, 3GPP TSG RAN WG2 Meeting #108 R2-1915555, 3GPP.
Fujitsu, Discussion on Basic Resource Allocation Methods for NRV2X Sidelink Communication, dated Jan. 11, 2019, pp. 1-13, 3GPP TSG RAN WG1 adhoc NR AH 1901 R1-1900250, 3GPP.
Fujitsu, Resource Allocation for NR V2X Sidelink Communication, dated Nov. 2, 2018, pp. 1-11, 3GPP TSG RAN WG1 Meeting #95 R1-1812410, 3GPP.
Fujitsu; "Discussion on Basic Resource Allocation Methods for NR-V2X Sidelink Communication"; 3GPP TSG RAN WG1 #96, Athens, Greece, Feb. 25 to Mar. 1, 2019; R1-1901946; 14 pages.
Intel Corporation, Remaining opens of sidelink synchronization for NR V2X design, dated Feb. 15, 2020, pp. 1-11, 3GPP TSG RAN WG1 Meeting #100 E R1-2000732, 3GPP.
International Search Report and Written Opinion, dated Dec. 9, 2020, pp. 1-7, issued in International Application No. PCT/CN2020/079846, National Intellectual Property Administration, Beijing, China.
Japanese Office Action with English translation, dated May 24, 2023, pp. 1-9, issued in Japanese Patent Application No. 2022-545821, Japanese Patent Office, Tokyo, Japan.
Japanese Office Action with English translation, dated Nov. 22, 2023, pp. 1-9, issued in Japanese Patent Application No. 2022-545821, Japanese Patent Office, Tokyo, Japan.
Kyocera, Multiple SCIs for UE-to-Network Relay, dated May 15, 2015, pp. 1-10, 3GPP TSG-RAN WG1 Meeting #81, R1-153106, 3GPP.
Partial Supplementary European Search Report, dated Dec. 5, 2022, pp. 1-16, issued in European Application No. 20889819.7., European Patent Office, Munich, Germany.
Supplementary European Search Report, dated Mar. 10, 2023, pp. 1-15, issued in European Patent Application No. 20889819.7, European Patent Office, The Hague, The Netherlands.
Xiaomi Communications; "On resource allocation of V2x communications"; 3GPP TSG RAN WG1 Meeting #94bis, Chengdu, China, Oct. 8-12, 2018; R1-1811422; 3 pages.
Canadian Office Action dated Oct. 29, 2024, issued in Canadian Patent Application No. 3,171,565, Canadian Intellectual Property Office, Gatineau, Quebec, 5 pages.
Office Action issued in Chinese Patent Application No. 202080098771.2 dated Nov. 26, 2024, w/English translation, 19 pages.
Office Action issued in U.S. Appl. No. 17/864,140 dated Dec. 20, 2024, 21 pages.
Chinese-language Office Action issued in Chinese Application No. 202080098078.5 dated Feb. 8, 2025 with English transiation (16 pages).
Korean-language Office Action issued in Korean Application No. 10-2022-7032423 dated Jan. 21, 2025 with English translation (9 pages).
LG Electronics Inc.; "[Running CR] Introduction of 5G V2X with NR Sidelink", 3GPP TSG-RAN WG2 Meeting #108 R2-1916120, 2019 (134 pages).

* cited by examiner

METHOD AND DEVICE FOR POWER-SAVING IN WIRELESS SIDELINK COMMUNICATION

CROSS REFERENCE

This application is a continuation of and claims priority to International Patent Application No. PCT/CN2020/079843, filed Mar. 18, 2020, which is herein incorporated by reference in its entirety.

TECHNICAL FIELD

This disclosure is directed generally to wireless communications and particularly to sidelink communication resource and control resource allocation and configuration for power-saving.

BACKGROUND

User equipments in a wireless network may communicate data with one another via direct sidelink communication channels without the data being relayed by any wireless access network nodes. Some application scenarios of sidelink communications such as those involving vehicular wireless network devices, may have communication requirements that are more stringent and unpredictable compared to other conventional applications involving UE-UE sidelink communications. It is critical to provide a resource allocation and provisioning mechanism to enable low-power and efficient use of both sidelink communication resources and control resources.

SUMMARY

This disclosure is directed to methods, systems, and devices related to wireless communication, and more specifically, to power-saving in sidelink communication between communication terminals.

In one embodiment, a method for controlling wireless sidelink communication is disclosed. The method includes determining, by a first user equipment (UE), a wireless resource configuration for specifying a first set of wireless resources for transmission of one or more sidelink control information in a sidelink resource period; and transmitting, by the first UE, prior to a transmission of a set of sidelink data over one of a set of second wireless resources within the sidelink resource period, a sidelink control information over one of the first set of wireless resources. The sidelink control information is configured to indicate to a second UE whether or not to monitor the set of second wireless resources during a configured time period following a reception of the sidelink control information In another embodiment, a method for controlling wireless sidelink communication is further disclosed. The method includes determining, by a first user equipment (UE), a wireless resource configuration for specifying a first set of wireless resources for reception of one or more sidelink control information in a sidelink resource period; monitoring, by the first UE, the first set of wireless resources for one or more sidelink control information from a second UE during the sidelink resource period; and monitoring a set of second wireless resources for a set of sidelink data from the second UE for a configured time period within the sidelink resource period after receiving a sidelink control information from the second UE. The sidelink control information is configured to indicate to the first UE whether or not to monitor the set of second wireless resources during the configured time period.

Various devices are further disclosed. Each of these devices includes a processor and a memory, wherein the processor is configured to read computer code from the memory to implement any one of the methods above.

Computer-readable media are further disclosed. Such a computer-readable medium includes instructions which, when executed by a computer, cause the computer to carry out any one of the methods above.

The above and other aspects and their implementations are described in greater detail in the drawings, the descriptions, and the claims below.

DETAILED DESCRIPTION

Figure 1:
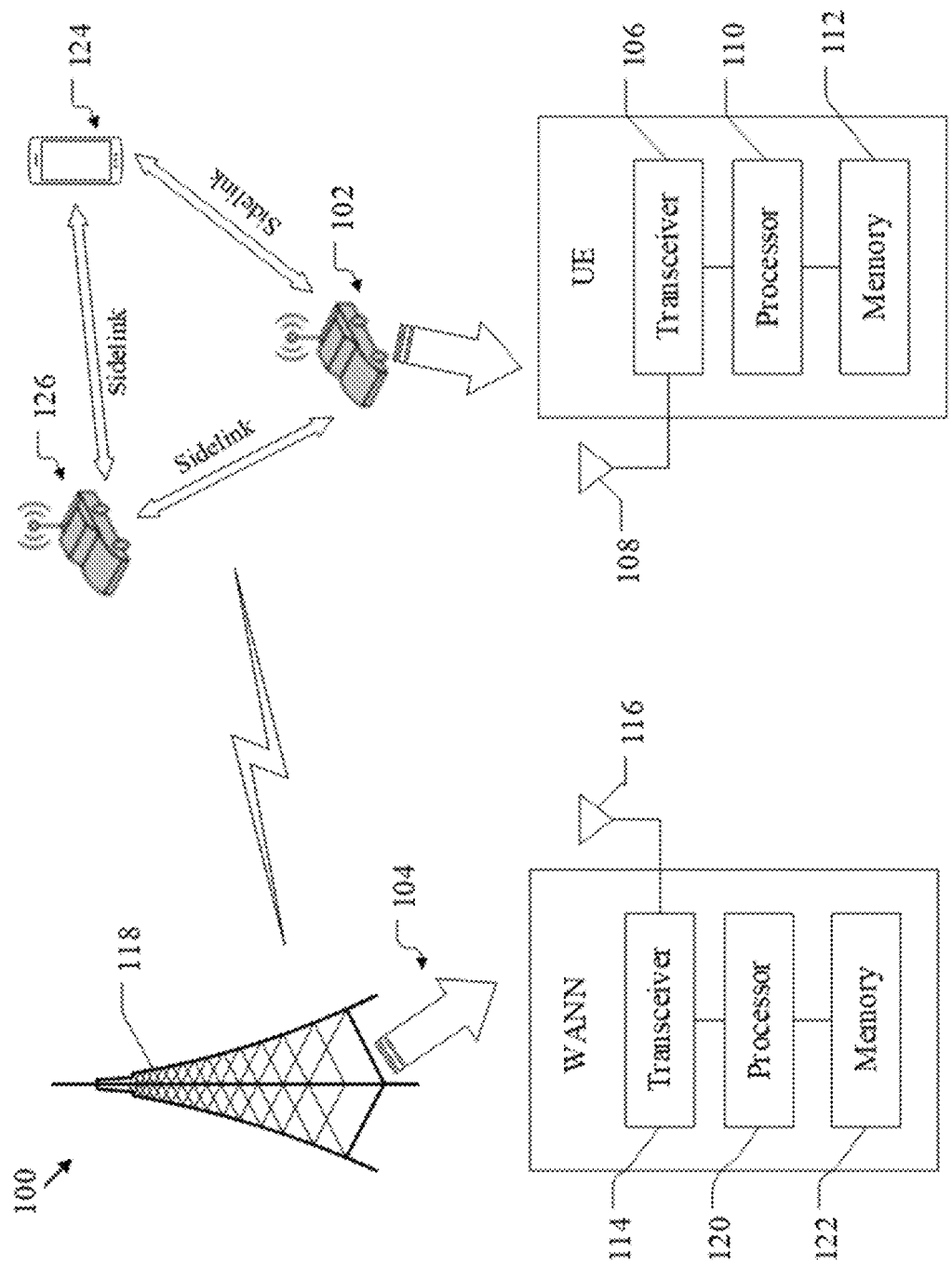
FIG. 1 illustrates an example diagram of a wireless communication network in accordance with various embodiments.

The technology and examples of implementations and/or embodiments in this disclosure can be used to improve performance in wireless communication systems. The term "exemplary" is used to mean "an example of" and unless otherwise stated, does not imply an ideal or preferred example, implementation, or embodiment. Section headers are used in the present disclosure to facilitate understanding and do not limit the disclosed technology in the sections only to the corresponding section. Please note that the implementations may, however, be embodied in a variety of different forms and, therefore, the scope of this disclosure or claimed subject matter is intended to be construed as not being limited to any of the embodiments set forth below. The various implementations may be embodied as methods, devices, components, or systems. Accordingly, embodiments of this disclosure may, for example, take the form of hardware, software, firmware or any combination thereof.

Vehicle network refers to a network system for wireless communication and information exchange among vehicles, pedestrians, roadside equipments, and the Internet and other data networks in accordance with various communication protocols and data exchange standards. Vehicle network communication helps improve road safety, enhance traffic efficiency, and provide broadband mobile data access and inter-network node data exchanges. The vehicle network communication may be categorized into various types as differentiated according to the communication endpoints, including but not limited to vehicle-to-vehicle (V2V) communication, vehicle-to-infrastructure/vehicle-to-network (V2I/V2N) communication, and vehicle-to-pedestrian (V2P) communication. These types of communication are referred to, collectively, as vehicle-to-everything (V2X) communication.

Vehicle network may heavily rely on sidelink communication between the terminal devices or user equipments (UEs) in the network. Sidelink communication, as used in this disclosure, refers to a direct wireless information exchange between UEs. For example, V2X communication may rely on direct sidelink data exchange from a source UE to a destination UE via an air interface without forwarding by any wireless base station. Such mode of communication has been researched and implemented in 3rd Generation Partnership Project (3GPP). An example V2X subsystem based on sidelink communication technology is illustrated as part of FIG. 1 and may be referred to as, for example, PC5-based V2X communication or V2X sidelink communication.

The application scenarios for V2X communication has increasingly expanded and diversified. Advanced V2X services and applications include but are not limited to vehicle platooning, extended sensors, semi-autonomous driving, fully autonomous driving, and remote driving. These applications and services require increasingly higher network performance including broader bandwidth, lower latency, and higher reliability. For example, these applications and services may require that the underlying sidelink communication technology support communication data packets of 50 to 12000 bytes in size, message transmission rates of 2 to 50 messages per second, maximum end-to-end delays of 3 to 500 milliseconds, transmission reliability of 90% to 99.999%, data transmission rates of 0.5 to 1000 Mbps, and signal ranges of 50 to 1000 meters, depending on specific data services needed for these applications.

While being capable of communicating among themselves using sidelinks, the various UEs described above may be also connected to wireless access networks, and to a core network via the access networks. The wireless access network and core network may be involved in configuring and provisioning communication resources needed for data and control information transmission/reception for sidelink communication. An example wireless access network may be based on, for example, cellular 4G LTE or 5G NR technologies and/or formats. FIG. 1 shows an example system diagram of a wireless access communication network 100 including UEs 102, 124, and 126 as well as a wireless access network node (WANN) 104. Each of the UEs 102, 124, and 126 may include but is not limited to a mobile phone, a smartphone, a tablet, a laptop computer, a vehicle on-board communication equipment, a roadside communication equipment, a sensor device, a smart appliance (such as a television, a refrigerator, and an oven), or other devices that are capable of communicating wirelessly over a network. The UEs may indirectly communicate with each other via the WANN 104 or directly via sidelinks. As shown in FIG. 1, UE 102, for example, may include transceiver circuitry 106 coupled to an antenna 108 to effectuate wireless communication with the WANN 104 or with another UE such as UE 124 or 126. The transceiver circuitry 106 may also be coupled to a processor 110, which may also be coupled to a memory 112 or other storage devices. The memory 112 may store therein computer instructions or code which, when read and executed by the processor 110, cause the processor 110 to implement various ones of the methods for sidelink resource allocation/configuration and data transmission/reception described herein.

Similarly, the WANN 104 may include a base station or other wireless network access points capable of communicating wirelessly over a network with one or more UEs. For example, the WANN 104 may be implemented in the form of a 4G LTE base station, a 5G NR base station, a 5G central-unit base station, or a 5G distributed-unit base station. Each type of these WANNs may be configured to perform a corresponding set of wireless network functions. The WANN 104 may include transceiver circuitry 114 coupled to an antenna 116, which may include an antenna tower 118 in various forms, to effectuate wireless communications with the UEs 102, 124, and 126. The transceiver circuitry 114 may be coupled to one or more processors 120, which may further be coupled to a memory 122 or other storage devices. The memory 122 may store therein instructions or code that, when read and executed by the processor 120, cause the processor 120 to implement various functions. These functions, for example, may include those related to the configuration and provisioning of wireless communication resources used for exchange of data and control information in sidelink communication between the UEs.

For simplicity and clarity, only one WANN and three UEs are shown in the wireless communication access network 100. It will be appreciated that one or more WANNs may exist in the wireless communication network, and each WANN may serve one or more UEs. While the UEs 102, 124, and 126 of FIG. 1 are shown as being served within one serving cell, they may alternatively be served by different cells and/or by no cell. While various embodiments of sidelink communication below are discussed in the context of the particular example cellular wireless communication access network 100, the underlying principle apply to other types of wireless communication networks.

Sidelink communication among the various UEs of FIG. 1 may support co-existence of various distinct communication cast types including unicast, group-cast (or multicast), and broadcast. In conventional technologies, the UEs deployed in the access network 100 may be required to perform exhaustive monitoring of a large range of sidelink wireless resources in either unicast, group-cast, or broadcast mode, thereby incurring a large power consumption. Such power consumption may be at an unacceptably high level for some low power UEs. To counter such problems, the various implementations described in this disclosure provide methods, devices, and systems for configuring and provisioning wireless communication resources for carrying sidelink data and/or for carrying sidelink control information to enable UEs to reduce their power consumption in monitoring and receiving unicast, group-cast, or broadcast sidelink data.

Wireless communication resources for transmission of either data or control information may be generally allocated in a time dimension and carrier frequency dimension. Each of these dimensions may be allocated and provisioned according to its smallest allocation granularity. A sidelink resource allocation may be specified as a collection of time-frequency blocks. The sidelink data communication resources, for example, may be configured and allocated as one or more sidelink resource pools. Each sidelink resource pool may be associated with one resource configuration. For the purpose of this disclosure, focus is place on the time dimension of the resource allocation. In particular, the time resources may be allocated in a granularity of a time slot of a predefined time length. Alternatively the time resources may be allocated at symbol level.

Figure 2:
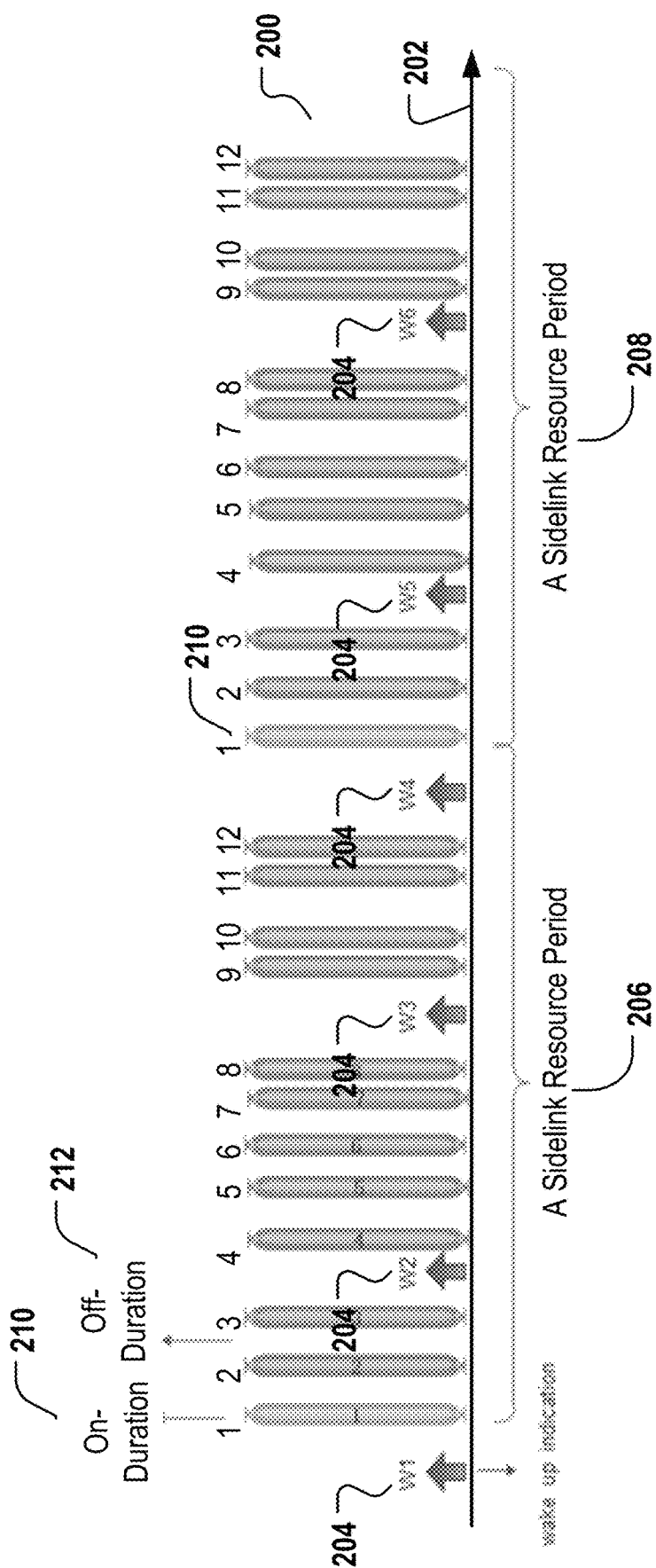
FIG. 2 illustrates an example wireless data communication and control resource allocation and configuration scheme for sidelink communication.

An example of a resource pool allocated to a UE for sidelink data communication is illustrated in FIG. 2 as 200. Such a resource pool may be configured and allocated to the UE for either unicast, group-cast, or broadcast. The sidelink communication resources allocated within the resource pool are shown as various vertical bars arranged along a time axis 202, with their widths representing time allocations and their height dimension representing allocations of carrier frequencies. While the frequency allocation for each time are shown as identical within the resource pool in FIG. 2 (as indicated by the identical frequency ranges), each of these resource bars may contain any suitable collection of any number of any carrier frequencies. Each of the bars may occupy one or more time slots or time symbols along the time axis 202. The time gaps between the bars denote time periods that no time resources for sidelink data communication are allocated. For simplicity of description of the implementations below, each of these bars are referred to as a sidelink data communication resource.

Such a sidelink resource pool of FIG. 2 for the particular UE use in transmitting or receiving sidelink data may be configured from the network side, e.g., from a WANN of a serving cell for the UE. In particular, control messages corresponding to sidelink resource configurations may be transmitted from the WANN to the UE. Alternatively, the sidelink resource pool may be preconfigured. In some other implementations, the UE may receive sidelink communication resource configurations from another UE. The UE, may be allocated with multiple sidelink resource pools, each specified by a corresponding sidelink resource configuration.

As an example, a sidelink resource pool 200 for the UE may be specified in a sidelink discontinuous reception (DRX) configuration sent to the UE. Such a resource pool 200, as configured by the DRX configuration, may include sidelink resources in repeating periods, referred to as sidelink resource periods (SRP), as shown by 206 and 208 in FIG. 2. Each of the periods 206 and 208 represents a sidelink resource configuration cycle. Such a sidelink resource configuration may include one or more resource bitmaps to indicate locations of these allocated resources in the resource pool 200 in time and frequency for a configuration cycle and then periodically repeats from SRP to SRP.

The time durations occupied by the resources allocated for sidelink communication on the time axis 202 in FIG. 2 may be referred as sidelink on-durations, as indicated by 210. The time gaps between the sidelink on-durations may be referred to as sidelink off durations, as indicated by 212. The UE, when attempting to receive sidelink data that are either unicasted, group-casted, or broadcasted, only needs to perform data monitoring at most during the sidelink on durations, thereby reducing data monitoring power consumption. If the UE is configured with a sidelink resource pool, the time slots or symbols included in the sidelink resource pool constitute the sidelink-on durations. Alternatively, if the UE is configured with sidelink DRX configuration, then in a DRX cycle, the DRX on durations represent the sidelink-on duration. The sidelink-on durations may be indicated by one or more time bitmaps.

The various example embodiments described in more detail below relate to configuration of resources for carrying sidelink control information and/or for carrying data information and some exemplary construction of the sidelink control information that enable the UEs to further reduce power consumption in sidelink communication.

First Example Embodiments

In the various implementations of this embodiment described below, it is assumed that a first UE (UE1) and a second UE (UE2) has established connection for sidelink communication in, for example, a unicast mode. UE1 represents a sidelink data transmitter and UE2 represents a corresponding sidelink data receiver. The implementations below are designed to enable UE2 to further reduce its power consumption when monitoring and receiving data from UE1.

In one implementation, UE1 and UE2 may first exchange capability information. Such capability information may include but is not limited to whether or not UE1 or UE2 support a sidelink power-saving function (SPSF). When UE1 determines that UE2 is a P-UE or otherwise support SPSF, or that the data to be transmitted by UE1 belongs to a data service with a destination identifier corresponding to a P-UE targeting service, UE2 may first transmit, for example, a DRX configuration of sidelink resource pool to UE1, or alternatively transmitting a configuration for a sidelink resource pool of limited time ranges to UE1. Prior to transmitting such a sidelink resource configuration to UE2, UE1 may obtain the configuration from the network side, e.g., a WANN of its serving cell. In some other implementations, rather than transmitting the sidelink resource configuration from UE1 to UE2, UE2 may directly obtain such configuration from its network side, e.g., a WANN of its serving cell. Such configuration may then be transmitted from UE2 to UE1 such that UE1 can determined the side communication resources for transmitting sidelink data to UE2. The sidelink resource configuration contains allocation of sidelink resources as a sidelink resource pool as shown by 200 in FIG. 2.

Once UE2 receives the sidelink resource configuration, it then determines the sidelink-on durations as shown in FIG. 2 for monitoring for sidelink data from UE1. In particular, it only needs to perform active monitoring in the sidelink-on durations and turns to sleep during the sidelink-off durations. It may, for example, monitor during all the sidelink-on durations labeled as 1-11 in FIG. 2. Because UE1 may not transmit sidelink data in all of these sidelink-on durations, UE2 may be further controlled to only actively monitor during a subset of the side-on durations to further reduce monitoring power consumption. In some implementations, the time range that UE2 is required to monitor for sidelink data may be divided into several time divisions so that UE2 may be controlled to over monitor in some time divisions. To achieve that, a corresponding sidelink wakeup control resource may be configured at the beginning of each time division. A sidelink wakeup control information or signal (herein referred to either wakeup control information or wakeup control signal) may be carried on a sidelink wakeup control resource and transmitted to UEs to indicate to the UEs whether or not a UE is required to monitor the sidelink-on durations in a subsequent time division (after a first time point corresponding to the sidelink wakeup control resource until a second time point corresponding to a next wakeup control resource in time).

Such a scheme is shown in FIG. 2. Specifically, arrows W1-W6 (labeled as 204) indicate time locations of the sidelink wakeup control resources. As an example, they divide the sidelink communication resources 200 (the bars) into three time divisions for each SRP (e.g., SRP 206). The first time division includes sidelink-on durations 1-3, whereas the second time division includes sidelink-on durations 4-8 and the third time division includes sidelink-on durations 9-12. Whether UE2 is required to monitor the sidelink-on durations can be controlled from time division to time division.

The one or more wakeup control resources 204 can be configured to indicate the time points (time slots or time symbol points) when UE2 is required to monitor the physical sidelink control channel (PSCCH) for receiving wakeup control information or signal. A wakeup control information or signal indicates whether or not UEs should monitor the sidelink-on durations during the time division following the wakeup control information/signal. The length of such a time division may be referred to as a configured time period, equal to the time length between the time point corresponding to the current wakeup control resource and the time point corresponding to the next wakeup control resource. For example, as shown in FIG. 2, if UE2 receives a wakeup control information or signal at the W1 time point indicating that UE2 needs to wake up to monitor for sidelink data, then UE2 wakes up to monitor the sidelink-on durations 1, 2, and 3 after W1 but before W2 for monitoring and receiving sidelink data. For another example, if UE2 monitors the wakeup control information or signal at W2 and does not receive any wakeup control information or signal (or that it determines that a received wakeup control information or signal indicates that UE2 does not need to wake up), then UE2 needs not to wake up after W2 and before W3 to monitor the sidelink-on durations 4, 5, 6, 7, and 8 for receiving sidelink data.

Figure 3:
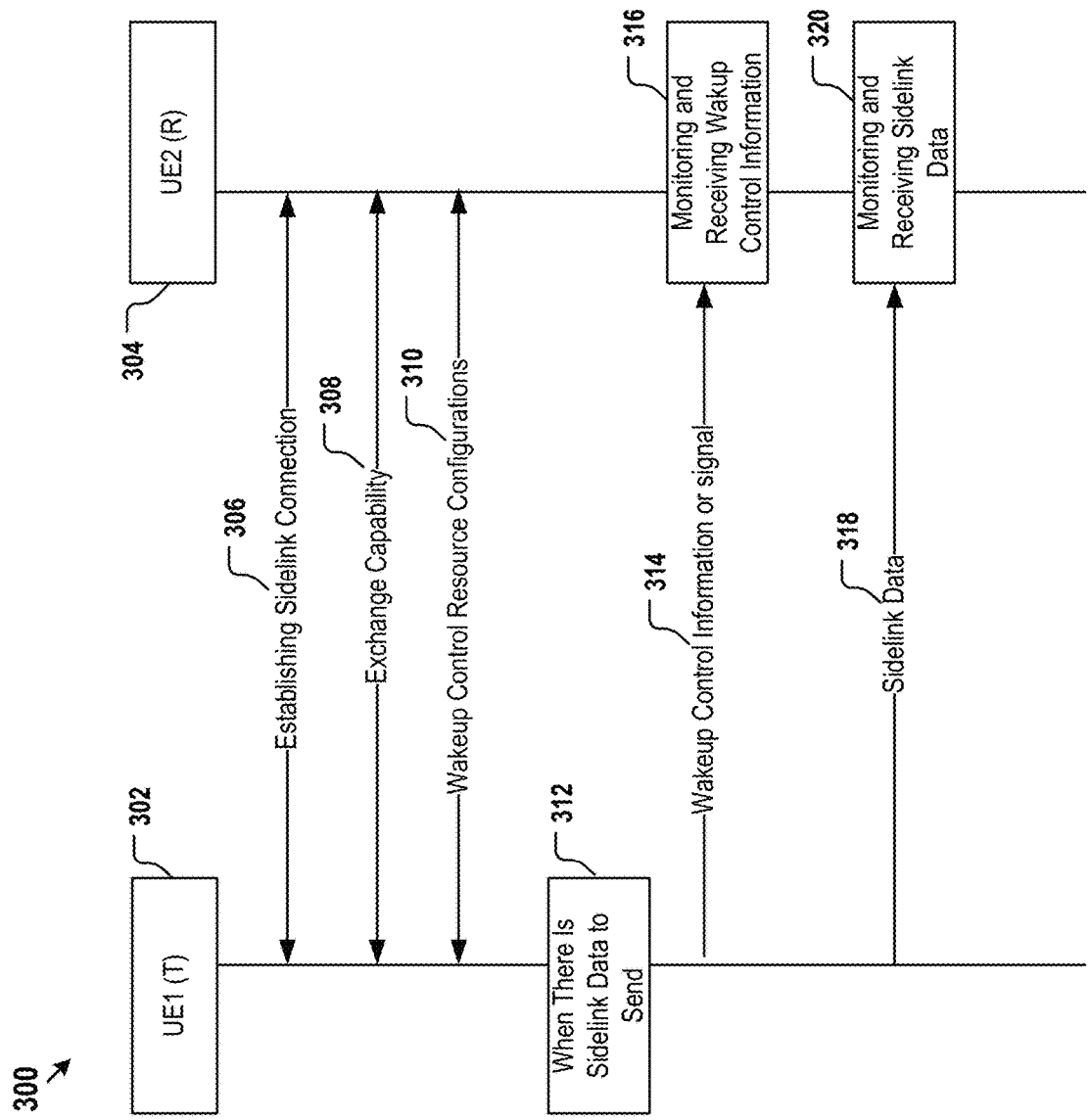
FIG. 3 illustrates an example logic flow for information exchange between two user equipments for unicast sidelink configuration and communication.

FIG. 3 shows an example logic flow 300 for information exchange between UE1 and UE2 according to the embodiment described above. As shown in FIG. 3, the transmitting UE1 302 and the receiving UE2 304 may establish a sidelink connection as shown in 306. They may further exchange sidelink capability as shown in 308 and described above. For power-saving, the wakeup control resource configuration may be sent from UE1 to UE2 or from UE2 to UE1, as shown by 310. The exchange of the wakeup control resource configuration between UE1 and UE2 may be accomplished via, for example, PC5-RRC (radio resource control) channels and interfaces. The wakeup control resource configuration may be provided by the network side. For example, network side of UE1 (e.g., a WANN of its serving cell) may provide such wakeup control resource configuration to UE1, and UE1 may obtain the wakeup control resource configuration from the network side and then send the wakeup control resource configuration to UE2. Alternatively, network side of UE2 (e.g., a WANN of its serving cell) may provide such wakeup control resource configuration to UE2, and UE2 may obtain the wakeup control resource configuration from the network side and then send the wakeup control resource configuration to UE1. Either UE1 or UE2, in order to request the wakeup control resource configuration from the network side, may first send a sidelink UE information to the network side. Such UE information may include at least one of the various items in List 1 below.

List 1

```
SL-TxResourceReq:=     SEQUENCE {
    sl-DestinationIdentity    SL-DestinationIdentity,
    sl-CastType    ENUMERATED {broadcast, groupcast, unicast, spare1},
    sl-QoS-InfoList    SEQUENCE (SIZE (E.maxNrofSL-QFIsPerDest)) OF
SL-QoS-Info    OPTIONAL,
}
SL-QoS-Info ::=    SEQUENCE{
    sl-QoS-FlowIdentity    SL-QoS-FlowIdentity-,
    sl-QoS-Profile    SL-QoS-Profile OPTIONAL
}
```

The information elements in List 1 are used by the network side (WANN and/or some other network node in the core network) to determine a sidelink control resource allocation and configuration, including, for example, information related to a traffic type of the sidelink communication. The traffic type information may include, for example, destination identity (service type), cast type (indicator of cast type such as unicast, group-cast, or broadcast), and quality of service (QoS) information of the sidelink communication for which the wakeup control resource needs to be determined. The QoS information, for example, may be represented by a QoS flow identity (QFI) and/or a QoS profile corresponding to the sidelink communication. Some of these information elements may be optional while the others may be mandatory, and the list above is merely provided as an example.

Continuing with the logic flow of FIG. 3, when UE1 has sidelink data to send or its sidelink data buffer is not empty, as shown in 312, it first sends a wakeup control information or signal on a wakeup control resource (e.g., the sidelink control time resource W1 in FIG. 2) preceding the sidelink resource for sending the sidelink data (the resource bar or sidelink-on duration 1 in FIG. 2) to UE2 via, for example, physical sidelink control channels (PSCCH), as shown by 314. Such signal is monitored by UE2, as shown by 316. UE2 receives the wakeup control information signal and determines that UE1 is about to send sidelink data, and wakes up to monitor the sidelink-on durations (e.g., the sidelink-on durations 1, 2, and 3 in FIG. 2) to receive the sidelink data sent by UE1 (as shown by 318) until a time point corresponding to the next wakeup control resource (e.g., at W2 of FIG. 2), as shown by 320. Conversely, if there is no sidelink data that need to be sent by UE1 or the sidelink data buffer at UE1 is empty, UE1 would not send any wakeup control information or signal (at, e.g., W1). UE2 would monitor the wakeup control resource (at W1) but would not detect any wakeup control information or signal and thus would not wakeup to monitor the sidelink resources (the sidelink-on durations 1, 2, and 3 in FIG. 2) for sidelink data communication.

In this example, referring to FIG. 2, while UE1 may not use all of the sidelink-on durations 1, 2, and 3 to transmit the sidelink data (for example, UE1 may only transmit data using the sidelink-on duration 1), UE2 would monitor all of the sidelink-on durations 1, 2, and 3 after receiving a wakeup control information or signal at W1, until determining at W2 whether to monitor sidelink-on durations 4, 5, 6, 7, and 8 during the next time division (between W2 and W3) depending on whether a sidelink control information or signal at W2 indicates such a need to monitor. Alternatively, UE1 may be configured to only transmit for one sidelink on duration after sending the wakeup control information or signal. As such, UE2 may only need to monitor for one sidelink-on duration after each time it receives a wakeup control information or signal.

The wakeup control information or signal described above for this embodiment, for example, may be a single-bit signal. For example, detection of such a signal implies a need to monitor one or more sidelink-on durations during the next time division. Alternatively, the wakeup control information or signal may be transmitted in other forms of signal or message.

Using the scheme described above, the receiving UE further reduced power consumption for monitor sidelink resource pool by dividing the sidelink resource pool into multiple time divisions (or zones) as indicated using the time points corresponding to the wakeup control resources as specified in the wakeup control resource configuration. As such, the receiving UE only needs to monitor one or more sidelink-on durations within a time division after receiving a wakeup control information or signal, rather than monitoring the entire sidelink resource pool, thereby further reducing power consumption for sidelink data monitoring.

The wakeup control resource configuration above may include at least one of the example information items shown in the list below for specifying and identifying the resources allocated for transmitting/receiving wakeup control information or signals.

List 2

```
WakeUpResourceConfig ::=    SEQUENCE {
    WakeUpResourceId        WakeUpResourceId,
    Or: resource            PSCCH-ResourceId
    WakeUpID                WakeUpId,
    timeOffset
}
```

As shown in the example List 2, a wakeup control resource configurations may include a sequence of resource configurations. Each configuration may include a time offset to specify a time location (either time slot location or symbol location) of the corresponding wakeup control resource along the resource time axis of FIG. 2. The wakeup control configuration may further include an identifier for the wakeup resource configuration, used, for example, to identify frequency resource for each wakeup control resource configuration. In particular, the physical layer may allocate frequency resources for the wakeup control information and such frequency resources may be provided identifiers by higher layers, and such identifiers may be included in the wakeup control configuration. Alternatively or additionally, a PSCCH resource ID information item may be included for identifying the frequency allocation. The wakeup identifier may be further included to, for example, identify the sequence of the wakeup control resource configurations. Optionally, and not shown in List 2 above, the wakeup control resource configuration may further include a source identity or a service destination identity to limit the applicability of a particular wakeup control resource configuration.

Second Example Embodiment

Various implementations of the second embodiment described below are similar to the implementations of the first embodiment above. The description below focuses on their differences. Other aspects of the second embodiment not explicitly included below under this current heading can be found above in the description for the various implementations of the first embodiment.

For this second example embodiment, it is also assumed that a first UE (UE1) and a second UE (UE2) has established connection for sidelink communication in, for example, a unicast mode. UE1 represents a sidelink data transmitter and UE2 represents a corresponding sidelink data receiver. In this embodiment, the wakeup control information may be implemented as a sidelink control information (SCI) message, referred to as a power-saving sidelink control information (PS-SCI) message. Rather than a simply wakeup signal (such as a single bit indicator signal) for the wakeup control information in the first embodiment, the PS-SCI message may be used to carry additional information. The PS-SCI message, like other SCI information, may be carried by, for example, the PC5 interface.

An example PS-SCI message may include at least one of the following information items.

A Wakeup Indication (e.g. 1-bit indicator/signal) for indicating to the receiving UE whether one not to monitor the sidelink-on duration or the sidelink resource pool for sidelink data following the time point of receiving the PS-SCI message until a time point for the next PS-SCI resource. Such an indicator provides similar function to the wakeup control information in the first embodiment.

Destination identity (or service identity) for identify a service corresponding to the sidelink communication. Such information helps the receiving UE to determine the destination identity and service type and to decide whether the service is of interest. If the service is not of interest, the receiving UE may forgo monitoring of the subsequent sidelink-on duration(s) for sidelink data.

Secondary cell (SCell) dormancy indication information for a multi-carrier scenario. In particular, with such indicator in a multi-carrier scenario, the recipient UE only needs to monitor for PS-SCI control resource on one of the carriers to obtain wakeup control information for other carriers. Such an indicator may be provide as a carrier bitmap, where each bit of the bitmap corresponds to one of The SCell group(s) configured by higher layers of the wireless network with the most significant bit (MSB) to the least significant bit (LSB) of the bitmap corresponding to the first to last configured SCell group.

In correspondence to the PS-SCI messages functioning as wakeup control information, wakeup control resource configurations may be specified to identity control resources needed for transmitting/receiving the PS-SCI messages. Such resource configurations are referred to as PS-SCI resource configurations (corresponding to the wakeup control resource configurations described in the first embodiment). A PS-SCI resource allocation for a sidelink communication may be specified as PS-SCI resource configurations and each of the configurations may include at least one of the information items shown in List 3 below.

List 3

```
SCI-Config:=                          SEQUENCE {
  slps-RNTI                             RNTI-Value,
  slps-Offset ENUMERATED {ms0dot125, ms0dot25, ms0dot5, ms1, ms2, ms3, ms4,
ms5, ms6, ms7, ms8, ms9, ms10, ms11, ms12, ms13, ms14, spare15, spare14, spare13,
spare12, spare11, spare10, spare9, spare8, spare7, spared, spared, spare4, spare3, spare2,
spare1},
  slps-WakeUp                         ENUMERATED {true}
OPTIONAL,
  ps-TransmitPeriodicSL-RSRP          ENUMERATED          {true}
OPTIONAL,
}
```

As shown in the example List 3, the PS-SCI resource configurations may include a sequence of PS-SCI control configurations, each corresponding to one of the W1-W6 of FIG. 2. An example PS-SCI resource configuration may include a time offset for specifying the time location of the corresponding PS-SCI resource for carrying PS-SCI message (functioning as a wakeup control information). Other information items that may be further included in a PS-SCI resource configuration are shown and described in more detail below in List 4.

List 4

```
slps-RNTI
RNTI value for scrambling cyclic redundant check (CRC) of SCI used for power saving.
slps-Offset
The start of the search-time of SCI with CRC scrambled by power saving radio network temporary
identifier (PS-RNTI) relative to the start of the sidelink-onDurationTimer.
slps-WakeUp
Indicates the UE to wake-up if SCI is not detected outside active time. If the field is absent, the UE
does not wake-up if SCI is not detected outside active time.
ps-TransmitPeriodicSL-RSRP
Indicates the UE to transmit periodic sidelink reference signal received power (SL-RSRP) report(s)
when the sidelink -onDurationTimer does not start. If the field is absent, the UE does not transmit
periodic SL-RSRP report(s) when the sidelink-onDurationTimer does not start.
```

For example, a wakeup configuration indicator may be optionally included in a PS-SCI configuration, denoted by slps-WakeUp in List 4 above. While whether or not for the recipient UE to wake up to monitor the subsequent sidelink-on duration or sidelink resource pool is determined according to the wakeup indication information or signal in a received PS-SCI message, the wakeup configuration indicator in the PS-SCI configuration may be designed to indicates to the UE whether to monitor the subsequent sidelink-on duration or sidelink resource pool when a PS-SCI message is not received at a time point for a corresponding resource allocated to the PS-SCI message. Specifically, when the wakeup configuration indicator is included in the PS-SCI configuration, the UE is required to monitor for sidelink data when a PS-SCI message is not received, and otherwise, if the wakeup configuration indicator is not included in the PS-SCI configuration, the UE is not required to monitor for sidelink data. Alternatively, when the wakeup configuration indicator is not included in the PS-SCI configuration, the UE is required to monitor for sidelink data when PS-SCI message is not received, and otherwise, if the wakeup configuration indicator is included in the PS-SCI configuration, the UE is not required to monitor for sidelink data. Such a configuration scheme would allow for an optional configuration parameter to force the UE to monitor for sidelink data when a transmitted PS-SCI message is not received, such that sidelink data can be still be received in case that the corresponding PS-SCI message was sent but lost during its transmission.

Figure 4:
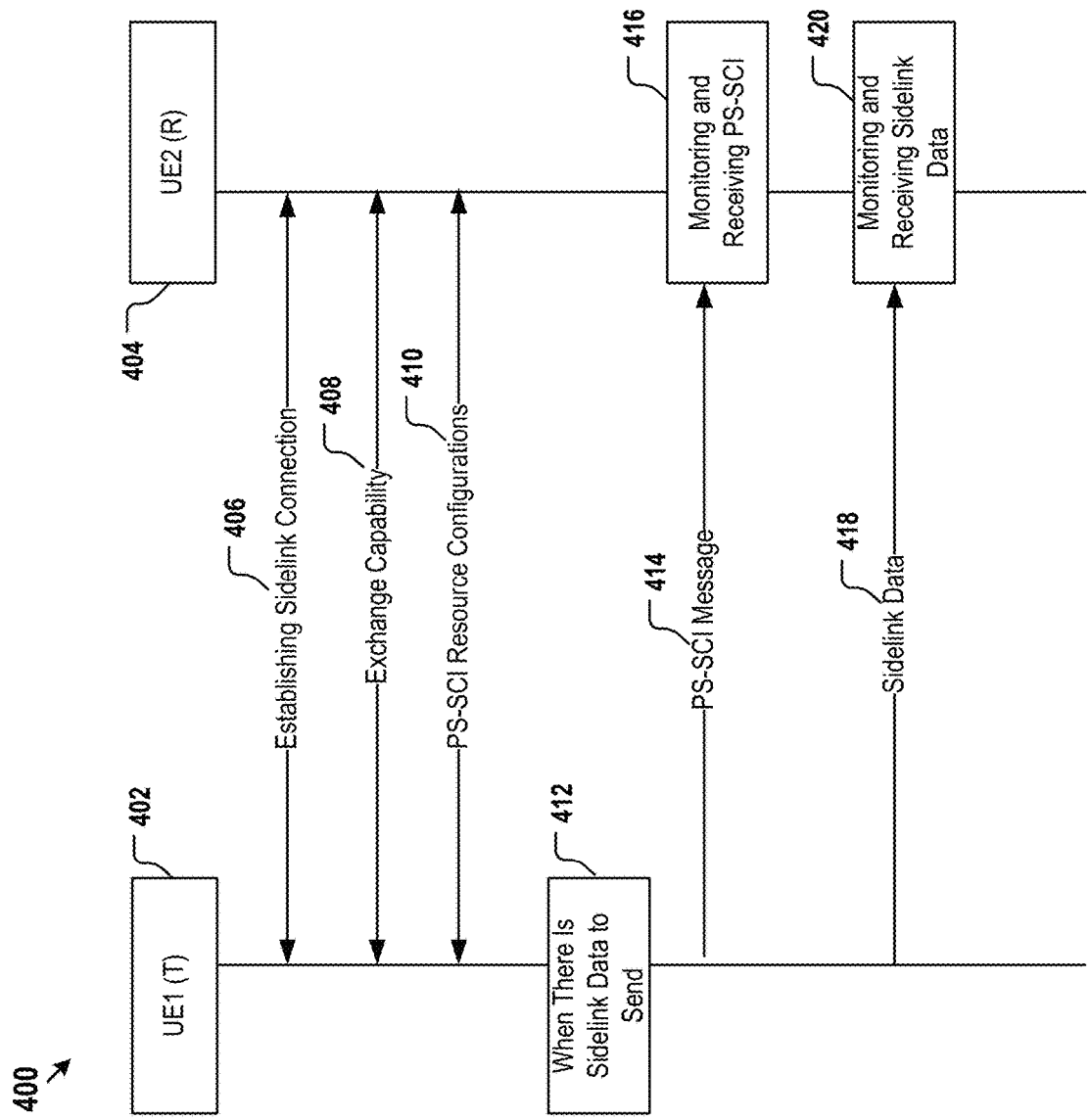
FIG. 4 illustrates another example logic flow for information exchange between two user equipments for unicast sidelink configuration and communication.

For this second embodiment, FIG. 4 shows an example logic flow 400 for information exchange between UE1 and UE2. The example logic flow 400 is similar to the logic flow 300 in FIG. 3 for the first embodiment, except that the wakeup control resource configurations and the wakeup control information or signal are replaced by PS-SCI resource configurations and PS-SCI message, respectively. Details of steps 406, 408, and 410, for example, can be found above in the description for steps 306, 308, and 310, respectively, and are not duplicated here.

In FIG. 4, UE2 monitors the PS-SCI resources (e.g., W1-W6 of FIG. 2) for PS-SCI messages. Once a PS-SCI message is detected, UE2 determines the wakeup indicator included therein to decide whether to monitor the subsequent sidelink-on duration or sidelink resource pool until the next time point corresponding to the next PS-SCI resource (next W in FIG. 2). Specifically, UE proceeds to monitor the subsequent sidelink-on duration or sidelink resource pool for sidelink data when indicated by the wakeup indicator, and does not monitor otherwise. In addition to FIG. 4, whether UE2 is required to monitor or not a sidelink-on duration or sidelink pool when a PS-SCI message is not received at the time points configured as PS-SCI resources (e.g., W1-W6 of FIG. 2) is determined by the wakeup configuration indicator described above (e.g., slps-WakeUp indicator of List 4).

In both the first and second embodiments, the wakeup control information/signal or the PS-SCI message is sent out by UE 1 only when there is subsequent sidelink data to transmit. The wakeup control information/signal or the PS-SCI message is otherwise not sent. In addition, the UEs are configured to always monitor the wakeup control resources or the PS-SCI resources allocated and configured by the wakeup control resource configurations or the PS-SCI resource configurations (e.g., W1-W6 resources in FIG. 2).

Third Example Embodiment

The various implementations below for a third example embodiment focus on sidelink control resource configuration for group-cast sidelink communication. It is assumed that a first UE (UE1) and a second UE (UE2) has established connection for sidelink communication in a group-cast mode. UE1 represents a sidelink data transmitter and UE2 represents a corresponding sidelink data receiver. UE1 and UE2 are among a group of UEs that form a group-cast UE group, alternatively referred to as a sidelink communication group. The sidelink communication group may further include a head UE (referred to as group head) and the head UE is denoted as UE3. The implementations below are designed to enable the UEs in the side communication group to reduce their power consumption when monitoring and receiving group-cast sidelink data.

In some implementations, if UE2 has power-saving requirements (e.g., if UE2 is a P-UE), after UE2 joins the sidelink communication group, UE3 (the head UE) is informed by the NAS layer signaling that there is at least one P-UEs in the sidelink communication group, and that a power-saving policy/configuration needs to be initiated. For example, sidelink resource pools or sidelink DRX as shown in FIG. 2 with limited sidelink-on durations may be allocated and configured for sidelink data communication for a UE (such as UE2) of the sidelink communication group.

In some implementations of this embodiment, and similar to the implementations above in the first embodiment, the time range that UE2 is required to monitor for sidelink data may be divided into several time divisions, a corresponding sidelink wakeup control resource may be configured at the beginning of each time division. A sidelink wakeup control information or signal may be carried over a sidelink wakeup control resource to indicate to UE2 whether or not UE2 is required to monitor the sidelink-on durations after a first time point corresponding to the sidelink wakeup control resource until a second time point corresponding to a next time point associated with the next wakeup control resource.

Figure 5:
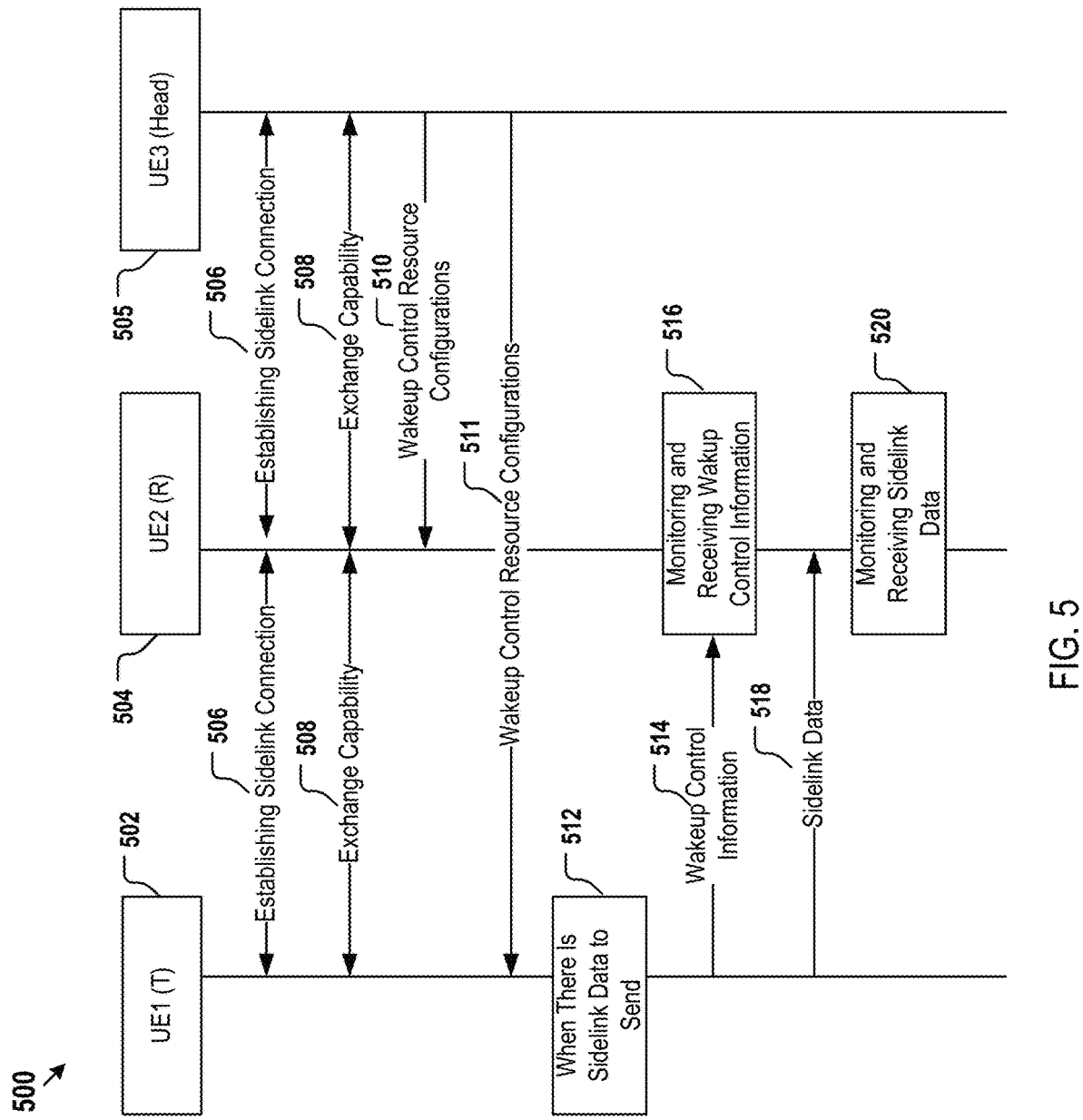
FIG. 5 illustrates an example logic flow for information exchange between user equipments for group-cast sidelink configuration and communication.

FIG. 5 shows logic flow 500 illustrating information exchange between UE1 (502), UE2 (504), and the head UE3 (505) for sidelink control configuration of UE1 and UE2 and sidelink data communication from UE1 to UE2. As shown in FIG. 5, the transmitting UE1 502, the receiving UE2 504, and the head UE 3 505 may establish sidelink connection at step 506. The UE group members may further exchange sidelink capability as shown in 508 and described above. Such capability exchange, for example, would inform UE3 that UE2 has power-saving requirements (e.g., UE2 is a P-UE).

For power-saving using sidelink time divisions, the wakeup control resource configurations for the sidelink communication group may be sent from UE3 to UE1 and UE2 (and other members of the group not shown in FIG. 5), as shown by 510 and 511 of FIG. 5. The wakeup control resource configurations may be transmitted via, for example, PC5-RRC channels and interfaces. The wakeup control resource configurations may be provided by the network side. For example, network side of UE3 (e.g., a WANN of its serving cell) may provide such wakeup control resource configurations and UE3 may obtain the wakeup control resource configurations from the network side and then send the wakeup control resource configurations to the members of the sidelink control group (such as UE1 and UE2). For UE3 to obtain such configurations from its network side, UE3 may send a request containing a sidelink UE information to its network side. Such sidelink UE information for example, may include at least one of the various items in List 1 above. Such UE information may further optionally include information of group members in the sidelink control group, such as group member identifiers, and the number of group members. In some other implementations, the wakeup control resource configurations may be obtained from network side by the group members rather than from the head UE.

The wakeup control resource configuration for the sidelink communication group may include at least one of the example information items shown in List 2 above. For example, the wakeup control resource configurations may include a sequence of resource configurations. Each configuration may include a time offset to specify a time location (either time slot location or symbol location) of the corresponding wakeup control resource along the resource time axis of FIG. 2. The wakeup control resource configuration may further include an identifier for the wakeup resource configuration, used, for example, to identify frequency resource for each wakeup control resource configuration. In particular, the physical layer may allocate frequency resources for the wakeup control information and such frequency resources may be provided identifiers by higher layers, and such identifiers may be included in the wakeup control configuration. Alternatively or additionally, a PSCCH resource ID information item may be included for identifying the frequency allocation. The wakeup identifier may be further included to, for example, identify the sequence of the wakeup control resource configurations. Optionally, and not shown in List 2 above, the wakeup control resource configuration may further include a source identity or a service destination identity to limit the applicability of a particular wakeup control resource configuration.

Continuing with FIG. 5, the member UEs in the group such as UE2 and UE1 receive the wakeup control resource configurations from UE3, as shown by 510 and 511. In step 512, when UE1 has sidelink data to send or its sidelink data buffer is not empty, it first sends a wakeup control information or signal on a wakeup control resource (e.g., the sidelink control time resource W1 in FIG. 2) preceding the sidelink resource for sending the sidelink data (the resource bar or sidelink-on duration 1 in FIG. 2) to UE2 via, for example, sidelink control channels (PSCCH), as shown by 514, which is monitored by UE2, as shown by 516. UE2 receives the wakeup control information signal and determines that UE1 is about to send group-cast sidelink data, and wakes up to monitor the sidelink-on durations to receive the sidelink data sent by UE1 (as shown by 518) until a time point corresponding to the next wakeup control resource, as shown by 520. Conversely, if there is no group-cast sidelink data need to be sent by UE1 or the sidelink data buffer at UE1 is empty, UE1 would not send any wakeup control information or signal. UE2 would monitor the wakeup control resource but would not detect any wakeup control information or signal and thus would not wakeup to monitor the sidelink resources for sidelink data communication.

The content of the wakeup control information or signal is similar to that of the first embodiment described above.

In group-cast sidelink applications, the member UEs in the sidelink communication group may share the same wakeup control resources specified in the wakeup control resource configurations above. Under such wakeup resource sharing, after a UE sent a wakeup control information or signal and proceeds to transmitting sidelink data, it may not be able to at the same time monitor a wakeup control resource for wakeup control information or signal. In some implementations, in order to avoid missing data reception, the transmitting UE may be configured to always monitor for sidelink data during the sidelink-on duration or sidelink resource pool in the next time division after it transmits wakeup control information and sidelink data during the previous time division.

Alternatively, member UEs of the sidelink communication group may be configured with separate wakeup control resources rather than sharing wakeup control resources. For example, the group head UE3 may configure different wakeup control resources for each UE in the group. As such, each wakeup control resource configuration in the sequence of wakeup control resource configurations of List 2 may be adapted to include a group member ID indicating a group member of the sidelink communication group to which the particular wakeup control resource configuration is applicable. An example modified sequence of wakeup control resource configurations is shown in List 5 below.

List 5

```
WakeUpResourcelist   SEQUENCE   (SIZE   (1..maxGroupMemberNum))   OF
WakeUpResourceConfig
WakeUpResourceConfig ::=    SEQUENCE{
GroupMemberID                   GroupMemberId,
WakeUpResourceId                WakeUpResourceId,
    Or: resource                PSCCH-ResourceId
  timeOffset                    CHOICE {
  ...
  }
}
```

The group wakeup control resource configurations of List 5 include a sequence of wakeup control resource configurations each for one of the members of the group. Each wakeup control resource configuration may include a set of time offsets to specify time slot or symbol locations of one or more wakeup control resources. The information items "wakeUpResrarchId or "PSCCH-ResourceId" relates to identification of frequency resources allocated for carrying wakeup control information or signal and are identical to the corresponding information items in List 2, which are explained in more detail in relation to the first embodiment. Each wakeup control resource configuration of List 5 specifically includes an identifier for the corresponding group member ("GroupMember ID") for indicating the member UE to which the particular wakeup control resources in the wakeup control resource configuration are allocated.

In some other implementations, particular when the number of group members are large and it becomes impractical to provide each group member with distinct wakeup control resource configuration, a set of wakeup control resource configurations may be allocated and one or more of the wakeup control resource configurations may be shared by more than one group members. For these implementations, the "GroupMemberID" in the List 5 for a particular wakeup control resource configuration above may include a set of IDs (rather than a single group member ID) for group members that share this particular wakeup control resource allocation. Alternatively, a group member bit map may be implemented instead to indicate the group members that share this particular wakeup control resource allocation (e.g., with 0 bit and 1 bit corresponding to a member in the bit map indicating that the member share and not share this particular resource, respectively). The group members that share wakeup control resources with others may be configured to always monitor for sidelink data during the sidelink-on duration or sidelink resource pool in the next time division after it transmits sidelink data during the previous time division. Group members that do not share wakeup control resources with others may not need to monitor for sidelink data during the sidelink-on duration or sidelink resource pool in the next time division after it transmits sidelink data during the previous time division. As such, the wakeup control resource configuration may optionally include an indicator that indicates whether or not a UE, after transmitting a wakeup control information or signal, should monitor the sidelink-on durations or sidelink resource pool during next time division.

Other aspects that are not explicitly described for the third embodiment may be found in the description for the first embodiment.

Fourth Embodiment

Various implementations of the fourth embodiment for group-cast sidelink described below are similar to the implementations of the third embodiment above, in combination with the second embodiment. Other aspects of this fourth embodiment not explicitly included below under this current heading can be found above in the description for the various implementations of the third and second embodiments.

Like the third embodiment, for this fourth example embodiment, it is assumed that a first UE (UE1) and a second UE (UE2) has established connection for sidelink communication in a group-cast mode. UE1 represents a sidelink data transmitter and UE2 represents a corresponding sidelink data receiver. UE1 and UE2 are among a group of UEs that form a group-cast UE group, alternatively referred to as a sidelink communication group. The sidelink communication group may further include a head UE (referred to as group head) and the head UE is denoted as UE3. The implementations below are designed to enable the UEs in the side communication group to reduce their power consumption when monitoring and receiving group-cast sidelink data.

Various aspects of this fourth embodiment is similar to the third embodiment, with the wakeup control information being replaced by the PS-SCI messages described in the second embodiment. The contents of the PS-SCI messages are similar to that described above in the second embodiment. Further, the wakeup control resource configurations of the third embodiment are replaced with PS-SCI resource configurations that may be implemented in manners similar to those of the second embodiment.

Figure 6:
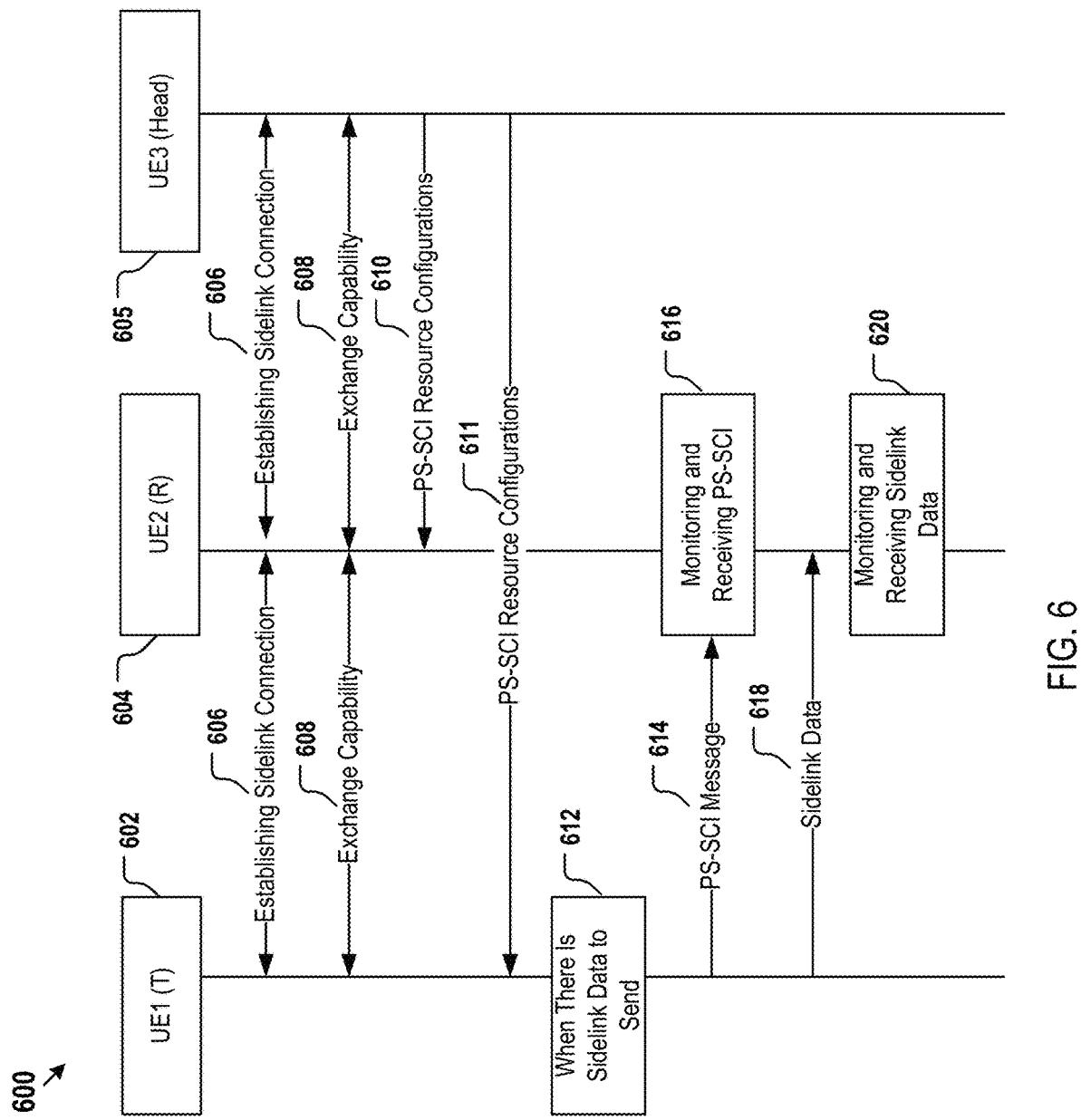
FIG. 6 illustrates another example logic flow for information exchange between user equipments for group-cast sidelink configuration and communication.

FIG. 6 shows logic flow 600 illustrating information exchange between UE1 (602), UE2 (604), and the head UE3 (605) for sidelink control configuration of UE1 and UE2 and sidelink data communication from UE1 to UE2. The example logic flow 600 is similar to the logic flow 500 in FIG. 5 for the third embodiment, again, with the wakeup control resource configurations and the wakeup control information or signal replaced by PS-SCI resource configurations and PS-SCI message, respectively. Details of steps 606, 608, 610, and 611 for example, can be found above in the description for steps 506, 508, 510, and 511, respectively, and are not duplicated here.

The PS-SCI resource configurations may include a sequence of PS-SCI control configurations similar to those specified in List 4 and described above for the second embodiment and are not duplicated here.

PS-SCI resource sharing among group member UEs may be similarly implemented as described above for the third embodiment. For example, members of the sidelink communication group may each be configured with separate PS-SCI resources. Alternatively, one or more of the members may share PS-SCI resources. Such sharing may be indicated by an additional information item of the PS-SCI resource configuration showing the sharing group members of the particular PS-SCI resources. In such implementations, a UE sharing PS-SCI resources with other UEs of the group may be configured to always monitor for sidelink data during the sidelink-on duration or sidelink resource pool in the next time division after it transmits PS-SCI message and sidelink data during the previous time division. Group members that do not share PS-SCI resources with others may not need to monitor for sidelink data during the sidelink-on duration or sidelink resource pool in the next time division after it transmits PS-SCI message and sidelink data during the previous time division. As such, the PS-SCI resource configuration may optionally include an indicator that indicates whether or not a UE, after transmitting a PS-SCI message and sidelink data should monitor the sidelink-on durations or sidelink resource pool during next time division. These optional information items that may be included in the PS-SCI resource configuration are similar to the corresponding optional information items above in the third embodiment for the wakeup control resource configurations.

Other aspects that are not explicitly described for the fourth embodiment may be found in the description for the third and second embodiments.

Fifth Embodiment

The embodiment provides various example implementations for configuring sidelink resources. In this embodiment, the sidelink resource configuration may be preconfigured for a UE or may be obtained by the UE from the network side (e.g., a WANN of its serving cell). This resource configuration combines both configuration of sidelink resources for data transmission and sidelink control resources for power saving. The sidelink control resources may include the wakeup control resources or PS-SCI resources described above in the first and third embodiments.

For example, the sidelink resource configuration may include a sidelink resource pool, such as that shown in FIG. 2. The sidelink resource configuration may further include a wakeup control resource configuration indicating one or more wakeup control resources for transmitting wakeup control information or signal. The sidelink resource configuration may optionally include a power-saving indicator for indicating that the sidelink resource pool included in the sidelink resource configuration can be used by power-saving UEs (such as P-UEs).

Such sidelink resource configuration may be used, for example, in sidelink broadcast. A receiving UE may be preconfigured with such sidelink resource configuration or obtain such sidelink resource configuration from its network side. The receiving UE may be configured to always monitor the wakeup control resources for wakeup control information or signal. When the receiving UE detects a wakeup control information or signal, it then wakes up to monitor the sidelink resource pool for receiving sidelink data until a time point corresponding to the next wakeup control resource. The receiving UE does not need to wake up to monitor the sidelink resource pool for sidelink data if it does not detect any wakeup control information or signal. Referring to FIG. 2, for example, if the receiving UE receives a wakeup control information or signal at W1 time point indicating that the receiving UE needs to wake up to monitor for sidelink data, then it wakes up to monitor the sidelink resource pool (sidelink resources 1, 2, and 3) after W1 but before W2 for monitoring and receiving sidelink data. For another example, if the receiving UE monitors the wakeup control resource at W2 and does not receive any wakeup control information or signal, then the receiving UE does not need to wake up after W2 and before W3 to monitor the sidelink resource pool (e.g., sidelink-resources 4, 5, 6, 7, and 8) for receiving sidelink data.

A transmitting UE may also be preconfigured with such sidelink resource configuration or obtain such sidelink resource configuration from its network side. When the transmitting UE determines that there is sidelink data to transmit (e.g., to broadcast), it first transmits a wakeup control information or signal on a wakeup control resource indicated in the wakeup control resource configuration. For example, the transmitting UE may use the next available wakeup control resource (in time) following the determination of the need to transmit data. The transmitting UE then transmits the sidelink data using the sidelink resource pool between the time points corresponding to the wakeup resource it used for transmitting the wakeup control information/signal and the next wakeup control resource. In other words, the transmitting UE always transmits a wakeup control information or signal on a wakeup control resource before transmitting the sidelink data on the sidelink resource pool. Referring to FIG. 2, for example, if the transmitting UE determines that it has sidelink data to transmit right before W1, it may first transmit a sidelink control information or signal at W1, and then transmits the sidelink data over the sidelink resources (1, 2, and 3) as needed. If the transmitting UE needs more sidelink resources than resources 1, 2, and 3 for transmitting the sidelink data, it may further transmit another wakeup control information or signal at W2, and continue to use one or more of the sidelink resources 4, 5, 6, 7, and 8 for transmitting additional sidelink data.

Sixth Embodiment

The embodiment provides various example implementations for configuring sidelink resource pool(s) for power-saving in sidelink communication.

One or more resource pools may be configured for sidelink. Some resource pools among these sidelink resource pools may be associated with power-saving uses. Such a power-saving sidelink resource pool, for example, may be provided with a small time resource range compensated by a large frequency resource range, such that the power-saving UEs only need to monitor such a sidelink resource pool for sidelink data for short time durations.

In some implementations, the one or more power-saving sidelink resource pools may be further divided into sidelink resource time divisions. Each sidelink time division may be a portion of a sidelink resource pool, one sidelink resource pool, or multiple sidelink resource pools. For example, the one or more power-saving sidelink resource pools may be divided into N sidelink resource time divisions. In some implementations, the number N may be explicitly or implicitly indicated in the one or more sidelink resource configurations corresponding to the one or more power-saving sidelink resource pools. Manners in which the time divisions of the one or more power-saving sidelink resource pools are made are described in various example implementations below.

These sidelink resource time divisions may be selected by UEs for sidelink communication based on traffic types. Such traffic types may include but are not limited to service destination identity, cast type (broadcast, group-cast, or unicast), and QOS types (represented by, for example, QFI or QoS profile). For example, if a power-saving UE is interested in a sidelink broadcast service corresponding to a certain type of traffic, it may monitor the sidelink resource time divisions corresponding to the traffic type. For example, such sidelink resource time divisions may be used by UEs based on destination identity of the sidelink communication. Merely as an example implementation, for a sidelink broadcast service destination identity=x, the broadcasting UE may select the yth sidelink resource time division from the N time divisions according to y=MOD (X, N). For another example, supposing m=log 2N, the broadcasting UE may select the yth sidelink resource time division from the N time divisions according to y, which is the value of m's most significant bit (MSB) or m's least significant bit (LSB) of the service destination identity. Other manners of mapping destination identity to the N time divisions of the one or more sidelink resource pools are contemplated.

Figure 8:
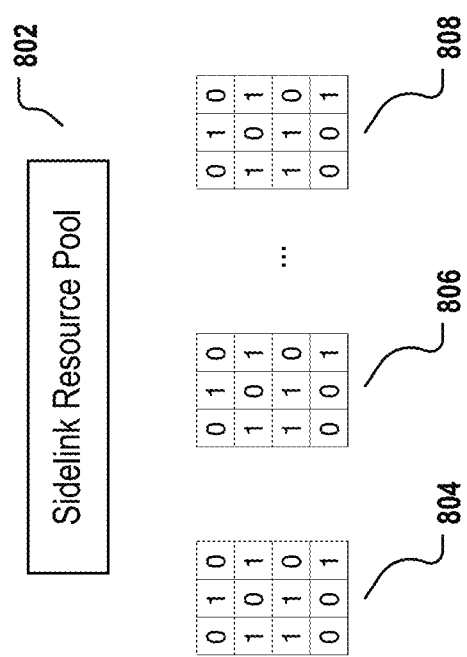
FIG. 8 illustrates another example wireless data communication resource allocation and configuration scheme for broadcast sidelink communication.
Figure 9:
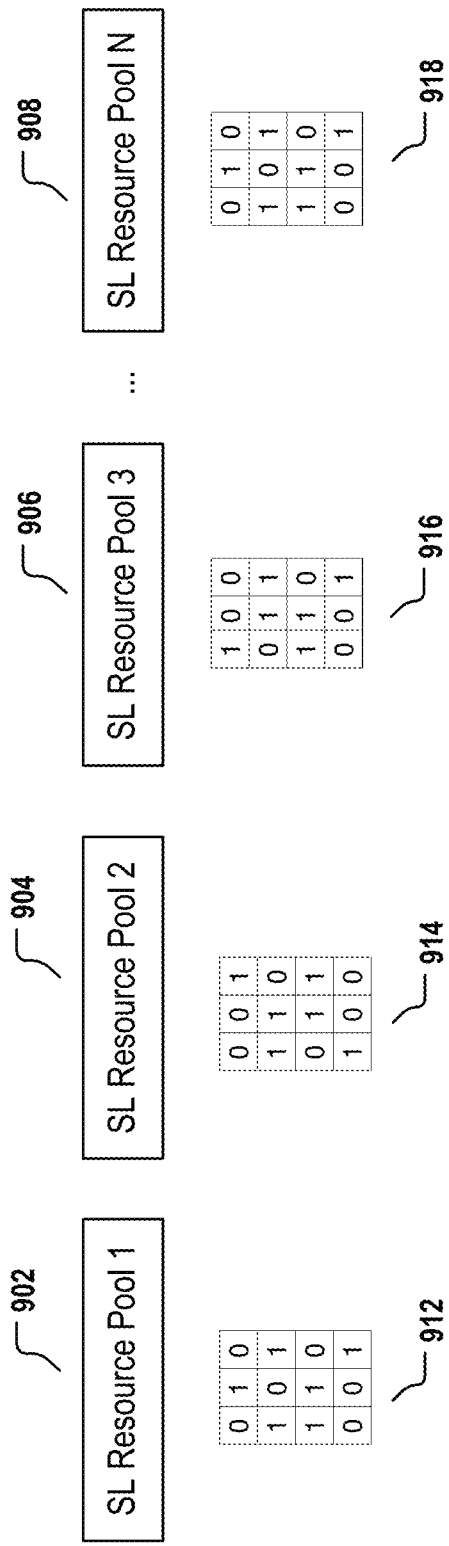
FIG. 9 illustrates another example wireless data communication resource allocation and configuration scheme for broadcast sidelink communication.

For sidelink resource configuration, UEs that are within coverage range of a serving cell may be configured by WANNs. UEs that are not covered by serving cells may be preconfigured. Multiple sidelink resource pools may be configured. Each sidelink resource pool may correspond to one sidelink resource configuration. For a particular sidelink resource pool, the corresponding sidelink resource configuration may include a power-saving indicator for indicating whether the sidelink resource pool is designated for power-saving uses (in some implementation, a lack of such an indicator indicates that the resource pool is designated for normal rather than power-saving uses). The sidelink resource configuration may further optionally include the number N to indicate the number of resource time divisions of the one or a collection power-saving sidelink resource pools. A sidelink resource configuration may further optionally include a traffic type indicator such as a service destination indicator for indicating whether the sidelink resource pool allocated in this configuration is to be used by UEs based on the traffic type of the sidelink communication. The various example implementations for sidelink resource configuration are illustrated in FIG. 7-9 and described in further detail below.

Figure 7:
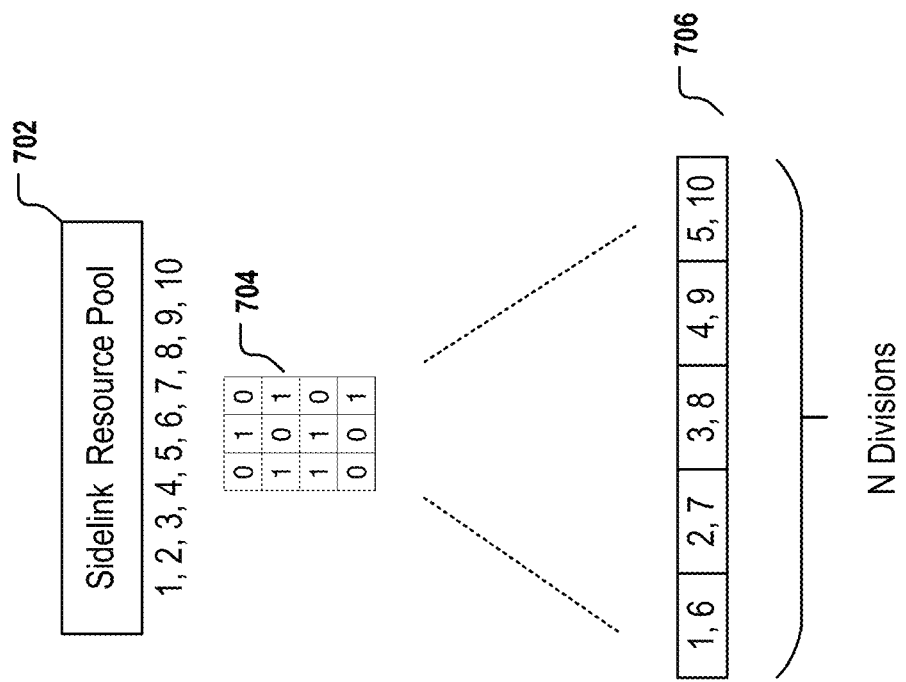
FIG. 7 illustrates an example wireless data communication resource allocation and configuration scheme for broadcast sidelink communication.

As shown in FIG. 7, a particular sidelink resource pool 702 may be configured for sidelink communication. The corresponding sidelink resource configuration may include, for example, a resource bitmap 704 for indicating the sidelink resources included in the sidelink resource pool 702. The sidelink resource configuration may include a positive number N for indicating a number of sidelink source time divisions of the sidelink resource pool 702, as shown by 706. In some implementations, the sidelink resources may be divided in time in an interlaced fashion. As shown by FIG. 7 merely as an example, the sequence of time resources of the sidelink resource pool are denoted by 1, 2, ..., 10. These time resources are divided into N=5 time divisions containing time resources (1, 6), (2, 7), (3, 8), (4, 9), and (5, 10). Other rules of division are contemplated.

Such a rule of division may be predefined. The sidelink resource configuration may further include a power-saving indicator for indicating that the sidelink resource pool 702 is usable by power-saving UEs. Alternatively, the presence of the positive number N in the sidelink resource configuration may be used as such an indicator. The sidelink resource configuration may further optionally include a traffic-type indicator for indicating the type of traffic that the sidelink resource pool 702 may be used for by UEs, including but not limited to service destination identity, cast type, and QOS type, as described above.

In some other implementations, as shown in FIG. 7, a particular sidelink resource pool 802 may be configured for sidelink communication. The corresponding sidelink resource configuration may include, for example, N separate resource bitmaps 804, 806, ..., and 808 for indicating the time divisions of the sidelink resources within the sidelink resource pool 802. The sidelink resource configuration may optionally include the positive number N for indicating the number of time divisions of the sidelink resources. Alternatively the positive number N may be not be explicitly included in the configuration since it may be implicitly derived from the number of bitmaps 804, 806, ..., and 808. The sidelink resource configuration may further include a power-saving indicator for indicating that the sidelink resource pool 702 is usable by power-saving UEs. Alternatively, the presence of the positive number N or the presence of multiple bitmaps 804, 806, ..., and 808 may be used as an indication that the sidelink resource pool 802 can be used for power-saving. The sidelink resource configuration may further optionally include a traffic-type indicator for indicating the type of traffic that the sidelink resource pool 702 may be used for by UEs, including but not limited to service destination identity, cast type, and QOS type, as described above.

In some other implementations, N sidelink resource pools may be collectively configured to form the N time divisions. FIG. 9 shows sidelink resource pools 902, 904, 906, and 908 forming N time divisions for power-saving uses. Each of the sidelink resource pool function as one sidelink resource time division. Each of these pools are associated with a sidelink resource configuration. Each sidelink resource configuration may include a resource bitmap, as shown by 912, 914, 926, and 918. The collection of sidelink resource pools 902, 904, 9076, and 908 may be selected for use by power saving UEs. The sidelink resource configuration for each of the sidelink resource pools, e.g., sidelink resource pool 902, may optionally include the positive number N for indicating the number of pools (or time divisions) participating in power-saving uses. The sidelink resource configuration may further include a power-saving indicator for indicating that the sidelink resource pool 702 is usable by power-saving UEs and for indicating that the sidelink resource pool corresponding to the sidelink resource configuration is part of the collection of resource pools forming the N time divisions. The sidelink resource configuration may further optionally include a traffic-type indicator for indicating the type of traffic that the sidelink resource pool 702 may be used for by UEs, including but not limited to service destination identity, cast type, and QOS type, as described above. As such, the power-saving sidelink resource pools 902, 904, 906, and 908 may be configured as either traffic-type specific or of general use for power-saving sidelink communication.

With the various sidelink resource configurations and allocation of resource pools above, transmitting (e.g., broadcasting) UE may perform the following steps when transmitting sidelink data. The transmitting UE may first receive the sidelink resource configurations, either by pre-configuration, or from its network side (e.g., a WANN of its serving cell). When the transmitting UE needs to transmit sidelink data, it selects from the sidelink resources a time division according to a traffic type of the sidelink communication. For example, the transmitting UE may select one or more of the N time divisions of sidelink resources for transmission based on a destination identity of the sidelink communication.

Likewise, a receiving UE of broadcast sidelink data may perform the following steps when receiving sidelink data. The receiving UE may first receive the sidelink resource configurations, either by pre-configuration, or from its network side (e.g., a WANN of its serving cell). The receiving then monitor the sidelink resources of interest. For example, if the receiving UE is interested in a broadcast data service with a particular destination identity, it then selects the corresponding time division(s) of sidelink resources to monitor for sidelink data. The sidelink data corresponding to the destination identity of interest would be transmitted in the time division(s) of sidelink resources monitored by the receiving UE, according to the various schemes and implementations of resource allocation and configurations above.

In some implementations, if a UE receive sidelink resource allocations from its serving WANN, the UE may obtain the sidelink resource configurations using the following example procedure. The UE may first send a buffer status report (BSR) to the WANN to request sidelink resource allocation. The BSR may include traffic type (such as service destination identity) information (as an index, for example), logic channel group (LCG) identifier, and a buffer size. The WANN may allocate sidelink resources according these parameters in the BSR and transmit one or more sidelink resource configurations to the UE. The sidelink resource configuration may include an allocation of sidelink resources and a traffic type index. The UE may then transmit data of the traffic type (e.g., the service destination) over the sidelink resources according to the various implementations described above.

Seventh Embodiment

The various implementations for this embodiment combines the implementation of the fifth and sixth embodiments above for sidelink resource configuration embedded with additional wakeup control resource configuration for further reducing power consumption of UEs in sidelink communication.

For example, the wakeup control resource configurations described above in the fifth embodiment may be embedded in the various sidelink resource configurations described in the sixth embodiment. A wakeup control resource configuration indicates one or more wakeup control resources for transmitting wakeup control information or signal. A wakeup control information or signal may be transmitted by a UE prior to sidelink data transmission to indicate to a receiving UE to monitor sidelink resources for sidelink data after a first time point corresponding to the wakeup control resource used for transmitting the wakeup control information and a second time point corresponding to the next wakeup control resource specified in the wakeup control configuration.

Each sidelink resource pool may be associated with a sidelink resource configuration. Each sidelink resource configuration may include on or more wakeup control resource configurations. Each wakeup control resource configuration may include one or more wakeup control resources.

In accordance with such sidelink resource configurations, when the transmitting UE determines that there is sidelink data to transmit (e.g., to broadcast), it first transmits a wakeup control information or signal on a wakeup control resource indicated in the wakeup control resource configuration. For example, the transmitting UE may use the next available wakeup control resource following the determination of the need to transmit data. The transmitting UE then transmit the sidelink data using the sidelink resource pool between the time points corresponding to the wakeup resource it used for transmitting the wakeup control information/signal and the next wakeup control resource. In other words, the transmitting UE always transmits a wakeup control information or signal on a wakeup control resource before transmitting the sidelink data on the sidelink resource pool. The selection of sidelink resources for transmitting sidelink data may be based on the various implementations described in the sixth embodiment. For example, the UE may use sidelink resources in a time division selected based on traffic type of the sidelink communication.

A receiving UE may be configured to always monitor the wakeup control resources for wakeup control information or signal. When the receiving UE detects a wakeup control information or signal, it then wakes up to monitor the sidelink resource pool for receiving sidelink data until a time point corresponding to the next wakeup control resource. The receiving UE does not need to wake up to monitor the sidelink resource pool for sidelink data if it does not detect any wakeup control information or signal. The selection of sidelink resources to monitor for sidelink data may be based on the various implementations described in the sixth embodiment. For example, the receiving UE may use sidelink resources in a time division selected based on traffic type of the sidelink communication (e.g., a destination identity corresponding to a sidelink broadcast service of interest to the receiving UE).

Eighth Embodiment

This embodiment provides example implementations for establishing unicast sidelink connection between UEs in a power-saving manner.

For example, if UE1 has not established any sidelink connection with UE2 for unicast sidelink communication, it cannot communicate with UE2 according to the power-saving schemes described in the previous embodiments. During this time, UE2 may monitor messages broadcasted by UE1. For example, UE2 may monitor a direct communication request (DCR) message from UE1. Because DCR message is carried in a broadcast signal, the schemes in the embodiments above for broadcast sidelink communication may be used for power-saving. Specifically, because UE1 sends the DCR message via PC5 broadcast using the source Layer-2 ID and the destination Layer-2 ID, the monitoring of the broadcast data can be based on the fifth, sixth, and seventh embodiments above. In addition, because a DCR message also includes other information including but not limited to an optional information of Target User Info (e.g., if the broadcasting UE can determine the Target User Info of a receiving UE, it can optionally include the Target User Info, otherwise it does not include the Target User Info) and if the broadcast message does carry the Target User Info of the recipient UE2, it can use the Target User Info as destination identity for calculating a time position of resource pool for transmission, thereby determining a time position for transmitting a wakeup control information. The recipient UE2 may correspondingly use its Application Layer ID as the destination identity to calculate the time locations of the resources for receiving the broadcast data. If the broadcast message does not carry the Target User Info of the recipient UE2, then other information such as an initial Application Layer ID or a V2X Service Info may be used as the destination identity for UE1 to calculate the time locations of the resources for the transmission of the wakeup control information and the broadcast message. Correspondingly, for UE2, if it is interested in this type of unicast service, it can calculate the time locations of resources using these parameters.

Ninth Embodiment

This embodiment provides example implementations for establishing group-cast sidelink connection between UEs in a power-saving manner.

For example, a P-UE may be interested in services associated with a group-cast. The P-UE may not be a group member yet and has not established any PC5 RRC group connection with UEs in the group. If all the UEs in the group support the power-saving sidelink functions, then the sidelink resource pools for the P-UE may be time divided according to traffic type such as service destination identities (as described above in the sixth embodiment). For example, the power-saving resource pools may be divided into N time divisions. For group-cast data transmission with a destination identity of x, a time division index y may be selected according to, for example, y=mod (x, N). For another example, supposing m=log 2N, y is the value of m's most significant bit (MSB) or m's least significant bit (LSB) of the service destination identity. Correspondingly, for each resource pool, wakeup or PS SCI control resources can be further configured. Then, if a UE needs to send a group-cast message, it first sends wakeup or PS SCI information or signal before sending the group-cast message. For UEs covered by serving cells, the power-saving sidelink resources can be configured by the WAN. For example, when configuring the resource pools for the P-UE, indicator(s) may be included in the configuration to indicate whether the resource pools support power-saving functions. The number N may be optionally included. A traffic type indicator may also be included to indicate whether the resource pool can be used based on traffic type. For each resource pool, wakeup or PS SCI resource configuration indicating wakeup or PS-SCI resources may further be included.

Further, and as described in the second embodiment, if the PS-SCI method is used, the PS-SCI message can also carry a traffic type such as service destination identity which is used to indicate which service/traffic will be sent in the next sidelink resource. Then a UE that is interested in this type of service or traffic type will wake up and monitor the sidelink resources for sidelink data. The UE further calculates the time division index y according to the traffic type such as destination identity. Different y may correspond to different PS-SCI, thereby further reducing the amount of wakeup. If a wakeup signal is used instead, the wakeup control resource can be determined by calculating y based on traffic type such as destination identity, thereby reducing the amount of wakeup.

If different wakeup or PS-SCI resources are configured in different serving cell, transmitting and receiving UEs may misunderstand one another. Such configuration may require coordination between serving cell. Such coordination may involve OAM (operation, administration and maintenance) function of the wireless network.

If the P-UE also needs to receive data from a legacy sidelink UE (a UE that does not support power-saving function) which does not send a wakeup control signal, the P-UE may then miss monitoring of sidelink data (because it does not receive any wakeup control signal). In order to avoid this, the transmission resources and reception resources of the legacy UE and the P-UE may be separated. The transmission resource for the legacy UE and the reception resources of the P-UE may be configured separately.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:
1. A method for controlling wireless sidelink communication, comprising:
   determining, by a first user equipment (UE), a wireless resource configuration for specifying a first set of wireless resources for transmission of one or more sidelink control information in a sidelink resource period; and transmitting, by the first UE, a sidelink control information of the one or more sidelink control information over one of the first set of wireless resources prior to a transmission of a set of sidelink data over one of a set of second wireless resources within the sidelink resource period, wherein the set of second wireless resources are allocated for sidelink communication and comprises one or more sidelink-on durations within the sidelink resource period, and the first set of wireless resources correspond to one or more time points and to the one or more sidelink control information;

the sidelink control information is transmitted over a first radio carrier at a first time point of the one or more time points; and the sidelink control information comprises wakeup indicators for indicating to a second UE whether or not to monitor other radio carriers for sidelink communications during a configured time period following the first time point.

2. The method of claim 1, wherein:
the configured time period corresponds to a time between the time point and a next time point in the one or more time points.

3. The method of claim 1, wherein the sidelink control information further comprises a wakeup indicator for indicating to the second UE whether or not to monitor the set of second wireless resources during a configured time period following a reception of the sidelink control information.

4. The method of claim 1, wherein the wireless resource configuration comprises one or more resource time offsets specifying the one or more time points and the wireless resource configuration comprises at least one of:
a first identifier for the first set of wireless resources;
a second identifier for the wireless resource configuration;
a sidelink wakeup configuration for indicating to the second UE whether or not to monitor the set of second wireless resources allocated for sidelink communication following a time point of the one or more time points when no sidelink control information is detected at the time point;
a radio network temporary identifier (RNTI) value for scrambling cyclic redundancy check (CRC) of the one or more sidelink control information; or
a sidelink reference signal received power (SL-RSRP) report indicator for indicating to the second UE to transmit a periodic SL-RSRP report when a sidelink-on duration timer does not start.

5. The method of claim 1, wherein the sidelink control information further comprises at least one of:
a destination identifier for identifying the set of sidelink data; or
an SCell dormancy indicator bitmap, where each bit of the bitmap corresponds to one of SCell groups configured by higher layers with the most significant bit to the least significant bit of the bitmap corresponding to the first to the last configured SCell groups.

6. The method of claim 1, wherein the first UE obtains the wireless resource configuration from the second UE and the second UE obtains the wireless resource configuration from its serving cell.

7. The method of claim 1, wherein:
the first UE and the second UE belongs to a group-cast UE group; and the first UE receives the wireless resource configuration from a third UE of the group-cast UE group.

8. The method of claim 7, wherein the first UE is configured to always monitor for sidelink data for at least one sidelink-on duration following its transmission of the sidelink control information.

9. The method of claim 7, wherein the wireless resource configuration further comprises a group member indicator that identifies at least one group member of the group-cast UE group that always monitor sidelink data for at least one sidelink-on duration following their transmission of sidelink control information.

10. The method of claim 9, wherein group member indicator comprises a bitmap or group member identifiers of the at least one group member of the group-cast UE group.

11. The method of claim 7, wherein each UE in the group-cast UE group are associated with one of a set of wireless resource configurations for specifying non-conflicting timing for transmission of sidelink control information among the group-cast UE group.

12. Method of claim 7, wherein the third UE obtains the wireless resource configuration from its serving cell, and before the third UE obtains the wireless resource configuration, the third UE is configured to send at least one of its sidelink UE information or sidelink UE information of the group-cast UE group to its serving cell for requesting the wireless resource configuration.

13. A method for controlling wireless sidelink communication, comprising:
determining, by a first user equipment (UE), a wireless resource configuration for specifying a first set of wireless resources for reception of one or more sidelink control information in a sidelink resource period;
monitoring, by the first UE, the first set of wireless resources for one or more sidelink control information from a second UE during the sidelink resource period; and
monitoring a set of second wireless resources for a set of sidelink data from the second UE for a configured time period within the sidelink resource period after receiving a sidelink control information of the one or more side link control information from the second UE, wherein
the set of second wireless resources is allocated for sidelink communication and comprises one or more sidelink-on durations within the sidelink resource period, and the first set of wireless resources correspond to one or more time points and to the one or more sidelink control information;
the sidelink control information is transmitted over a first radio carrier at a first time point of the one or more time points; and
the sidelink control information comprises wakeup indicators for indicating to the second UE whether or not to monitor other radio carriers for sidelink communications during the configured time period following the first time point.

14. The method of claim 13, wherein:
the configured time period corresponds to a time between the time point and a next time point in the one or more time points.

15. The method of claim 13, wherein the sidelink control information further comprises a wakeup indicator for indicating to the first UE whether or not to monitor the set of second wireless resources during a configured time period following a reception of the sidelink control information.

16. The method of claim 13, wherein the wireless resource configuration comprises one or more resource time offsets specifying the one or more time points and the wireless resource configuration comprises at least one of:
- a first identifier for the first set of wireless resources;
- a second identifier for the wireless resource configuration;
- a sidelink wakeup configuration for indicating to the first UE whether or not to monitor the set of second wireless resources allocated for sidelink communication following a time point of the one or more time points when no sidelink control information is detected at the time point;
- a radio network temporary identifier (RNTI) value for scrambling cyclic redundancy check (CRC) of the one or more sidelink control information; or
- a sidelink reference signal received power (SL-RSRP) report indicator for indicating to the second UE to transmit a periodic SL-RSRP report when a sidelink-on duration timer does not start.

17. The method of claim 13, wherein the sidelink control information further comprises at least one of:
- a destination identifier for identifying the set of sidelink data; or an SCell dormancy indicator bitmap, where each bit of the bitmap corresponds to one of SCell groups configured by higher layers with the most significant bit to the least significant bit of the bitmap corresponding to the first to the last configured SCell groups.

* * * * *